Aug. 13, 1957
A. M. BENZIN
2,802,370
POWER TRANSMITTING AND SPEED CHANGING MECHANISM
Filed June 2, 1953
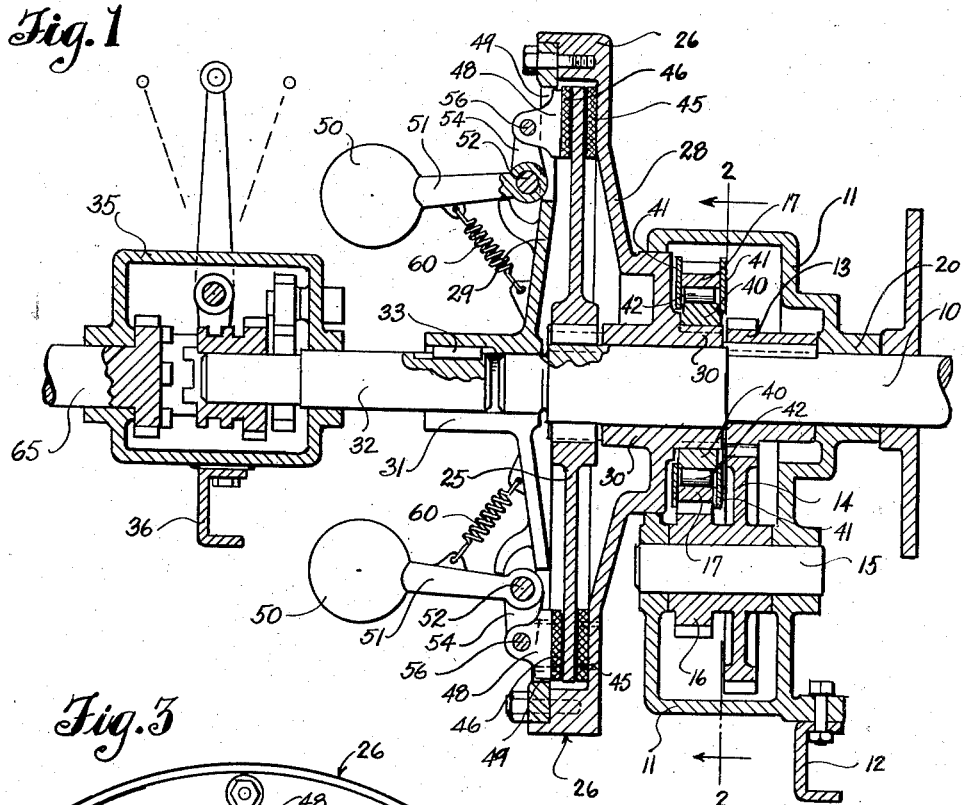
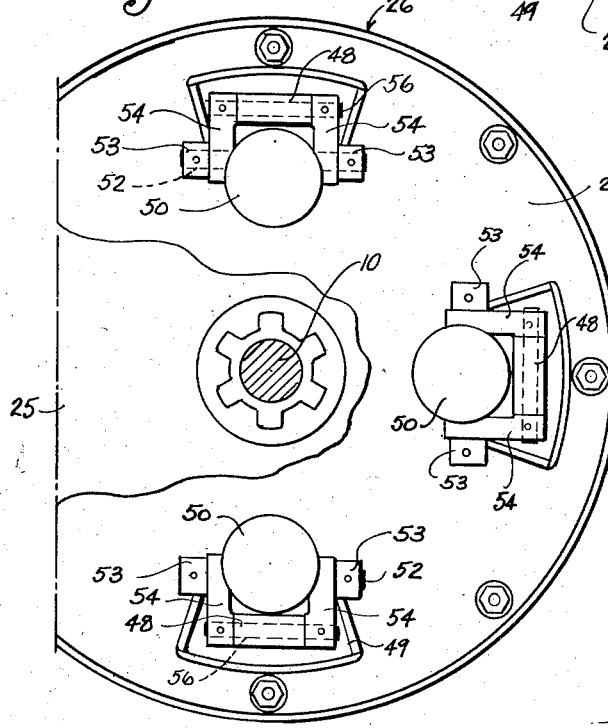
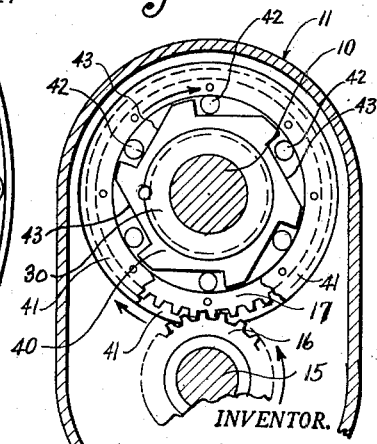
INVENTOR.
ALEXIS M. BENZIN
BY
Cook & Robinson
ATTORNEYS 2,802,370
Patented Aug. 13, 1957

2,802,370
POWER TRANSMITTING AND SPEED CHANGING MECHANISM

Alexis M. Benzin, Brussels, Belgium

Application June 2, 1953, Serial No. 359,075

2 Claims. (Cl. 74—336.5)

This invention relates to improvements in power transmitting and speed changing mechanism as designed primarily for use in connection with the driving of motor vehicles, boats, or the like, and it has reference more particularly to a mechanism for effecting an automatic change from one driving speed to another in accordance with a certain acceleration or de-acceleration of the vehicle in which it is used.

It is the principal object of the present invention to provide a mechanism whereby power may be transmitted from an engine driven shaft through a gear reduction to a vehicle driving shaft to propel the vehicle at what might be designated "low speed" or "starting speed" and with which mechanism there is associated a clutch through which a direct driving connection between the driven and driving shafts is automatically established upon the vehicle reaching a certain speed.

It is a further object of the invention to provide a transmission mechanism of the character above stated wherein the speed changes are effected automatically through a friction clutch and centrifugal governor mechanism by which the present invention is characterized.

Further objects of the invention reside in the details of construction and combination of parts, and in the mode of operation of the mechanism, as will hereinafter be fully described.

In accomplishing the above mentioned and other objects of the invention, I have provided the improved details of construction, the preferred forms of which are illustrated in the accompanying drawings, wherein:

Fig. 1 is a longitudinal sectional view of a power transmission and speed changing mechanism embodying the improvements of the present invention therein.

Fig. 2 is a cross-section of the mechanism taken on the line 2—2 in Fig. 1.

Fig. 3 is a face view of the automatic centrifugal clutch mechanism of this invention; parts being broken away for explanatory purposes.

The present mechanism has not, in the present drawings, been illustrated in connection with any particular type or kind of vehicle. However, it is to be understood that it is applicable to present day automobiles, trucks, boats, and other mechanisms or machines where changes in driving speeds and direction of travel are desired or required. The present showing is especially applicable for use in connection with the driving of automobiles and the like.

Referring more in detail to the drawings:

10 designates what may be an engine driven shaft; the engine not herein being shown. The shaft 10 is herein shown to extend through a gear housing 11 that is fixed securely to what may be a supporting cross-beam 12. Keyed on the shaft 10 within the gear housing 11, is a gear wheel 13 that operates in driving mesh with a substantially larger gear wheel 14 that is mounted to revolve freely on a cross-shaft 15; this shaft being spaced below and parallel with shaft 10 with its opposite end portion mounted in the opposite side walls of the housing 11.

Formed integral with the hub portion of gear 14, and also coaxial of the gear, is a relatively small gear wheel 16 that operates in driving mesh with a ring gear 17 that is mounted in housing 11 about the shaft 10 and constitutes the outer member of an over running clutch mechanism, shown in Fig. 2 and later described in detail.

It is shown in Fig. 1 that the driven shaft 10 extends through the housing 11 and, at the entering side thereof, it is revolubly contained in a bearing 20. Mounted on shaft 10, at the opposite side of the housing 11, is a friction clutch mechanism that includes a relatively large friction disk 25 that is keyed to shaft 10 and which disk is enclosed within a housing, designated generally by numeral 26, that comprises opposite face plates or walls 28 and 29 that are joined together at their outer edges. The plate 28 has a hub portion 30 freely revoluble on the shaft 10 and one end portion of this hub is extended into the housing 11. The opposite face plate 29 has a hub portion 31 into which the end portion of shaft 10 extends and is freely rotatable therein. This hub extends beyond the end of shaft 10 and contain one end of a power transmission shaft 32 therein; this shaft being keyed in the hub, as at 33, so that it will be caused to rotate with the clutch housing 26. The shaft 32 extends into a gear case 35 that is fixedly supported by what may be a cross-beam 36, as shown in Fig. 1.

The annular gear wheel 17 previously mentioned is the outer member of an over-running clutch comprising an inner member 40 that is keyed on the hub portion 30 of the face plate 28 of the clutch housing 26. Fixed to the opposite faces of annular gear wheel 17 are annular disks or plates 41—41 which freely contain the member 40 between them; clutch rollers 42 are contained between the inner cylindrical surface of gear 17, and inclined surfaces 43 of the member 40, and the clutch arrangement is such that a driving connection can be established between part 40 and gear 17 with these parts rotating in the direction indicated by the arrows in Fig. 2 to drive the housing 26. With the ring gear being driven in the direction indicated in Fig. 2, through the reduction gears 13, 14 and 16, the clutch housing 26 will be caused to rotate at low speed, and shaft 32 to be driven accordingly.

The peripheral portion of friction disk 25 is disposed between annular friction bands 45 and 46. The band 45 is secured to the inner face of side plate 28. The friction band 46 is supported by a plurality of blocks 48 that project outwardly through openings 49 in the housing side plate 29. Mounted on the outside face of the housing wall plate 29, at equally spaced angular intervals, are four centrifugal weights 50, formed at the outer ends of lever arms 51; these being fixed at their inner ends to supporting shafts 52, that are rotatably mounted at their ends in bearings 53—53 cast on the face plate 29. Fixed to each shaft 52 are lever arms 54—54 that have pivot pin connections 56, with the outer end portions of the blocks 48. Springs 60, attached to the weight carrying lever arms 51 and to the side plate 29 continuously draw the weights inwardly to disengage the friction bands from the clutch plate.

It will be understood that with the mechanism at rest, there is no driving connection between clutch disk 25 and the housing 26. However, with the starting of the engine, the housing 26 is caused to rotate by reason of the driving connection provided through the reduction gears 13, 14 and 16, and the clutch elements, 17, 42 and 40. As the speed of rotation of housing 26 increases, with the pick of speed of the driven vehicle, the centrifugal force of the weights gradually overcomes the inward pull of the springs 60. As the weights swing outwardly, the blocks 48 press the friction band 46 against the disk 25. Finally, when a certain speed of rotation of housing 26 and shaft 32 has been attained, the disk 25 will be tightly gripped and held against rotation relative to the disk housing 26. When this takes place, a direct driving connection is established between shafts 10 and 32, and they will turn in unison. When this direct driving connection is effected, the housing will be driven by disk 25 and the clutch roller is released permitting the gear 17 to turn freely about the shaft 10.

Should the driving speed of shaft 10 be decreased to such extent that the springs 60 overcome the centrifugal force of weights 50, then the friction clutch is released, and driving can be reestablished through the gear train for slow speed operation.

In the present showing provision has been made for shaft 32 to be connected with a vehicle drive shaft 65 through gearing contained in the housing 35, whereby either forward or reverse driving is made possible. This, however, forms no part of the present invention and will not be described.

Having thus described my invention, what I claim as new therein and desire to secure by Letters Patent is:

1. A power transmission and speed changing mechanism comprising an engine driven shaft, a clutch housing mounted on said shaft for rotation relative thereto, a gear train associated with the housing and shaft and through which the housing can be rotatably driven by the shaft at a reduced speed; said gear train including therein an over-riding clutch, a friction disk keyed on the engine driven shaft and contained within the said housing, a vehicle driving shaft keyed to the said housing for rotation thereby, friction blocks movably mounted in and rotatable with the wall of the housing secured to vehicle driving shaft, clutch actuating means mounted on the housing to rotate therewith and operable at a predetermined speed of rotation of the housing to actuate the blocks to press the friction disk into driving contact with the housing to cause them to rotate in unison thus to effect a direct driving connection between engine driven and vehicle driving shafts.

2. A power transmission and speed changing mechanism comprising an engine driven shaft, a clutch housing with a hub rotatable on said shaft, a vehicle driving shaft secured to and rotatable with said housing, a gear train driven by the said engine driven shaft to rotatably drive the said housing at a reduced speed; said gear train including therein an over-riding clutch comprising an inner member that is keyed on a hub of said housing, an outer member of ring gear form, and clutch rollers between the inner member and ring gear through which the ring gear can operate to drive the inner member, to rotate said housing and vehicle driving shaft, a friction disk keyed on the engine driven shaft within the said housing, a friction band fixed in the housing for driving contact by one face of the disk, friction blocks mounted in the wall of the housing secured to the vehicle driving shaft, a second friction band secured to said blocks and engageable with the other face of the disk, a centrifugal actuator mechanism mounted on the housing to rotate therewith and operable at a predetermined speed of rotation of the housing to actuate said blocks against the friction disk and cause it to be pressed against same friction band thus to cause the disk to drive the housing to turn the vehicle driving shaft in unison with the engine driven shaft.

References Cited in the file of this patent

UNITED STATES PATENTS

| | | |
|---|---|---|
| 766,551 | Sturtevant et al. | Aug. 2, 1904 |
| 797,383 | Sturtevant et al. | Aug. 15, 1905 |
| 1,734,491 | Keller | Nov. 5, 1929 |
| 1,795,135 | Molly | Mar. 3, 1931 |
| 1,909,191 | Stafford | May 16, 1933 |
| 1,985,503 | Keller | Dec. 25, 1934 |
| 2,286,585 | Simpson | June 16, 1942 |